(12) United States Patent
Nishikawa et al.

(10) Patent No.: US 10,381,156 B2
(45) Date of Patent: Aug. 13, 2019

(54) MULTILAYER CERAMIC CAPACITOR AND MANUFACTURING METHOD THEREOF

(71) Applicant: TAIYO YUDEN CO., LTD., Chuo-ku, Tokyo (JP)

(72) Inventors: Jun Nishikawa, Takasaki (JP); Shusaku Ueda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/908,549

(22) Filed: Feb. 28, 2018

(65) Prior Publication Data

US 2018/0301282 A1 Oct. 18, 2018

(30) Foreign Application Priority Data

Apr. 17, 2017 (JP) .................. 2017-081417

(51) Int. Cl.
| | |
|---|---|
| *H01G 4/12* | (2006.01) |
| *H01G 4/30* | (2006.01) |
| *H01G 4/005* | (2006.01) |
| *C04B 35/468* | (2006.01) |
| *C04B 35/622* | (2006.01) |

(52) U.S. Cl.
CPC ....... *H01G 4/1218* (2013.01); *C04B 35/4682* (2013.01); *C04B 35/62272* (2013.01); *C04B 35/62277* (2013.01); *C04B 35/62281* (2013.01); *C04B 35/62286* (2013.01); *H01G 4/005* (2013.01); *H01G 4/1236* (2013.01); *H01G 4/30* (2013.01); *C04B 2235/404* (2013.01)

(58) Field of Classification Search
CPC .... H01G 4/1218; H01G 4/005; H01G 4/1236; H01G 4/30; H01G 4/012; H01G 4/1227; H01G 4/33; H01G 4/248; C04B 35/4682; C04B 35/62272; C04B 35/62277; C04B 35/62281; C04B 35/62286; C04B 2235/404
USPC ....................................... 361/321.2
See application file for complete search history.

(56) References Cited

U.S. PATENT DOCUMENTS

2016/0049255 A1* 2/2016 Sugita ............... H01G 4/30
361/301.4
2017/0040111 A1* 2/2017 Kim ................ H01G 4/012

FOREIGN PATENT DOCUMENTS

JP 2003017356 A 1/2003

* cited by examiner

*Primary Examiner* — Michael P McFadden
(74) *Attorney, Agent, or Firm* — Law Office of Katsuhiro Arai (57) ABSTRACT

A multilayer ceramic capacitor includes: a multilayer structure in which each of a plurality of ceramic dielectric layers and each of a plurality of internal electrode layers are alternately stacked wherein: a concentration of a rare earth element of at least one of an end margin region and a side margin region is lower than that of a capacity region; a total concentration of Si and B of the at least one of the end margin region and the side margin region is higher than that of the capacity region.

8 Claims, 8 Drawing Sheets

| | | Ho (atm%) | Mg (atm%) | V (atm%) | Mn (atm%) | Si (atm%) | B (atm%) | Al (atm%) |
|---|---|---|---|---|---|---|---|---|
| | DIELECTRIC MATERIAL | 0.38 | 1 | 0 | 0.15 | 0.56 | 0 | 0 |
| COMPARATIVE EXAMPLE 1 | REVERSE PATTERN MATERIAL | 0.38 | 1 | 0 | 0.38 | 1 | 0.16 | 0 |
| COMPARATIVE EXAMPLE 2 | REVERSE PATTERN MATERIAL | 0.38 | 1 | 0 | 2.25 | 2.28 | 0.76 | 0.16 |
| EXAMPLE 1 | REVERSE PATTERN MATERIAL | 0 | 1 | 0 | 2.25 | 2.28 | 0.76 | 0.16 |
| | DIELECTRIC MATERIAL | 0.38 | 0 | 0.093 | 0.15 | 0.56 | 0 | 0 |
| COMPARATIVE EXAMPLE 3 | REVERSE PATTERN MATERIAL | 0.38 | 0 | 0.093 | 0.38 | 1 | 0.16 | 0 |
| COMPARATIVE EXAMPLE 4 | REVERSE PATTERN MATERIAL | 0.38 | 0 | 0.093 | 2.25 | 2.28 | 0.76 | 0.16 |
| EXAMPLE 2 | REVERSE PATTERN MATERIAL | 0 | 0 | 0.093 | 2.25 | 2.28 | 0.76 | 0.16 |
| | DIELECTRIC MATERIAL | 0.38 | 1 | 0 | 0.15 | 0.56 | 0 | 0 |
| COMPARATIVE EXAMPLE 5 | REVERSE PATTERN MATERIAL | 0.38 | 1 | 0 | 0.38 | 1 | 0.16 | 0 |
| COMPARATIVE EXAMPLE 6 | REVERSE PATTERN MATERIAL | 0.38 | 1 | 0 | 2.25 | 2.28 | 0.76 | 0.16 |
| EXAMPLE 3 | REVERSE PATTERN MATERIAL | 0 | 1 | 0 | 2.25 | 2.28 | 0.76 | 0.16 |

FIG. 7

| | | CRACK OCCURRENCE RATE | NG RATE OF HUMIDITY RESISTANCE | CAPACITY ACQUISITION RATE | LIFE PROPERTY | SINTERABILITY |
|---|---|---|---|---|---|---|
| DIELECTRIC MATERIAL 1 | | | | | | |
| COMPARATIVE EXAMPLE 1 | REVERSE PATTERN MATERIAL | 21/400 | 21/400 | — | — | — |
| COMPARATIVE EXAMPLE 2 | REVERSE PATTERN MATERIAL | 0/400 | 2/400 | — | — | — |
| EXAMPLE 1 | REVERSE PATTERN MATERIAL | 0/400 | 0/400 | × | × | ○ |
| DIELECTRIC MATERIAL 2 | | | | | | |
| COMPARATIVE EXAMPLE 3 | REVERSE PATTERN MATERIAL | 23/400 | 22/400 | — | — | — |
| COMPARATIVE EXAMPLE 4 | REVERSE PATTERN MATERIAL | 0/400 | 4/400 | — | — | — |
| EXAMPLE 2 | REVERSE PATTERN MATERIAL | 0/400 | 0/400 | ○ | ○ | × |
| DIELECTRIC MATERIAL 3 | | | | | | |
| COMPARATIVE EXAMPLE 5 | REVERSE PATTERN MATERIAL | 22/400 | 20/400 | — | — | — |
| COMPARATIVE EXAMPLE 6 | REVERSE PATTERN MATERIAL | 0/400 | 3/400 | — | — | — |
| EXAMPLE 3 | REVERSE PATTERN MATERIAL | 0/400 | 0/400 | ○ | ○ | ○ |

FIG. 8

MULTILAYER CERAMIC CAPACITOR AND MANUFACTURING METHOD THEREOF

CROSS-REFERENCE TO RELATED APPLICATION

This application is based upon and claims the benefit of priority of the prior Japanese Patent Application No. 2017-081417, filed on Apr. 17, 2017, the entire contents of which are incorporated herein by reference.

FIELD

A certain aspect of the present invention relates to a multilayer ceramic capacitor and a manufacturing method thereof.

BACKGROUND

A multilayer ceramic capacitor has a multilayer structure in which dielectric layers and internal electrode layers are alternately stacked, and each of the stacked internal electrode layers are alternately extracted to each of two edge faces of the multilayer structure. The multilayer ceramic capacitor has a capacity region and margin regions around the capacity region. In the capacity region, two internal electrode layers extracted to different edge faces face with each other. The margin regions include end margin regions and side margin regions. In the margin regions, contraction during a sintering may delay, compared to the capacity region. A crack may occur in the multilayer ceramic capacitor, because of a difference of the contractions. And so, Japanese Patent Application Publication No. 2003-17356 discloses a technology for reducing the difference of the contractions.

SUMMARY OF THE INVENTION

However, with the technology, it is difficult to sufficiently reduce the difference of the contractions.

The present invention has a purpose of providing a multilayer ceramic capacitor and a manufacturing method of the multilayer ceramic capacitor that are capable of sufficiently reducing the difference of the contractions.

According to an aspect of the present invention, there is provided a multilayer ceramic capacitor including: a multilayer structure in which each of a plurality of ceramic dielectric layers and each of a plurality of internal electrode layers are alternately stacked, a main component of the plurality of dielectric layers being ceramic, the multilayer structure having a rectangular parallelepiped shape, the plurality of internal electrode layers being alternately exposed to a first edge face and a second edge face of the multilayer structure, the first edge face facing with the second edge face, wherein: a concentration of a rare earth element of at least one of an end margin region and a side margin region with respect to a main component ceramic is lower than a concentration of the rare earth element of a capacity region with respect to a main component ceramic; a total concentration of Si and B of the at least one of the end margin region and the side margin region with respect to the main component ceramic is higher than a total concentration of Si and B of the capacity region with respect to the main component ceramic; the capacity region is a region in which a set of internal electrode layers exposed to the first edge face of the multilayer structure face with another set of internal electrode layers exposed to the second edge face of the multilayer structure is a capacity region; the end margin region is a region in which internal electrode layers coupled to the first edge face of the multilayer structure face with each other without sandwiching internal electrode layers coupled to the second edge face of the multilayer structure and a region in which internal electrode layers coupled to the second edge face of the multilayer structure face with each other without sandwiching internal electrode layers coupled to the first edge face of the multilayer structure; and the side margin region is a region that covers edge portions to which the plurality of internal electrode layers extend toward two side faces other than the first edge face and the second edge face.

According to an aspect of the present invention, there is provided a manufacturing method of a multilayer ceramic capacitor including: a first step of providing a first pattern of a metal conductive paste on a green sheet including main component ceramic grains; a second step of providing a second pattern including main component ceramic grains, on a part of the green sheet around the metal conductive paste; and a third step of baking a ceramic multilayer structure that is obtained by stacking a plurality of layer units obtained in the second step, wherein: a total concentration of Si and B of the second pattern with respect to the main component ceramic of the second pattern is higher than a total concentration of Si and B of the green sheet with respect to the main component ceramic of the green sheet; and a concentration of a rare earth element of the second pattern with respect to the main component ceramic of the second pattern is lower than a concentration of the rare earth element of the green sheet with respect to the main component ceramic of the green sheet.

DETAILED DESCRIPTION

A description will be given of an embodiment with reference to the accompanying drawings.

Figure 1:
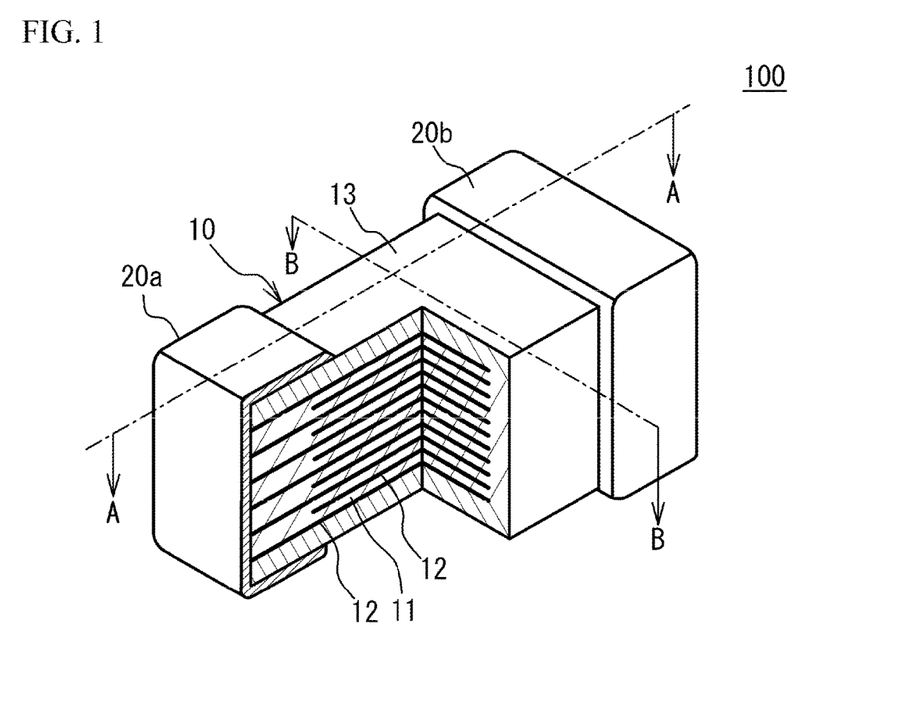
FIG. 1 illustrates a partial perspective view of a multilayer ceramic capacitor.
Figure 2:
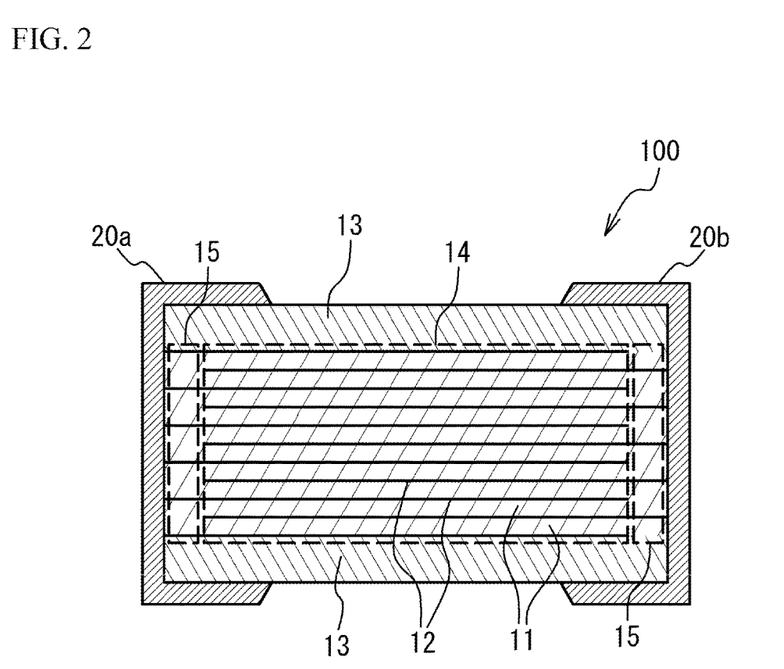
FIG. 2 illustrates a cross sectional view taken along a line A-A of FIG. 1.
Figure 3:
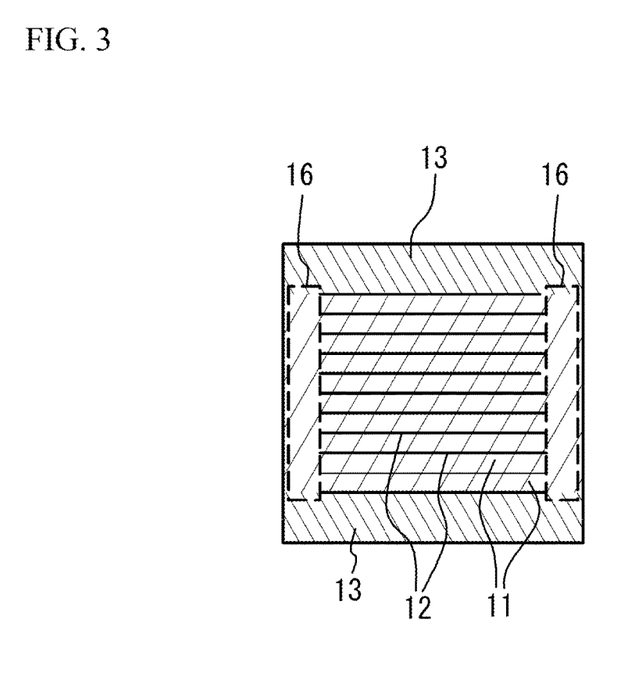
FIG. 3 illustrates a cross sectional view taken along a line B-B of FIG. 1.

(Embodiment) FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces.

Figure 4A:
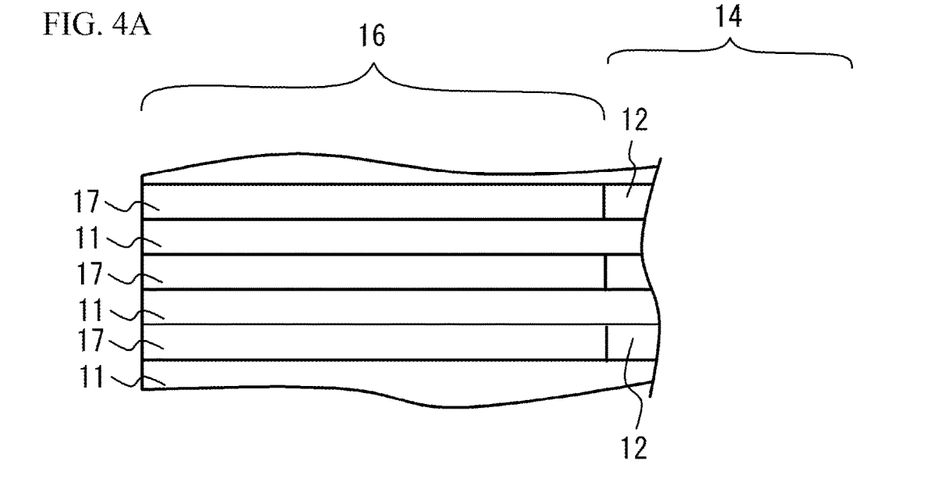
FIG. 4A illustrates an enlarged cross sectional view of a side margin region.

FIG. 4A illustrates an enlarged view of a cross section of the side margin region 16. The side margin region 16 has a structure in which each of the dielectric layers 11 and each of reverse pattern layers 17 are alternately stacked in a stacking direction of the dielectric layers 11 and the internal electrode layers 12 in the capacity region 14. Each of the dielectric layers 11 of the capacity region 14 and each of the dielectric layers 11 of the side margin region 16 are continuously formed. With the structure, a gap is suppressed between the capacity region 14 and the side margin region 16.

Figure 4B:
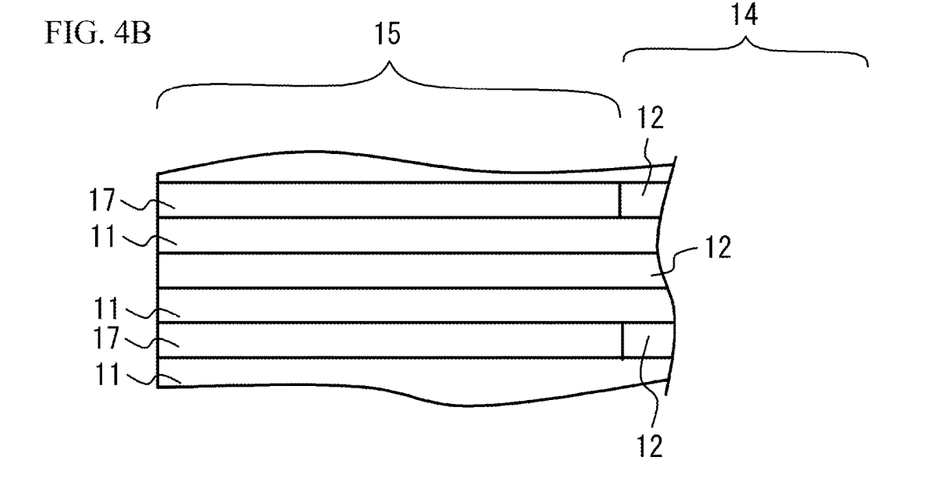
FIG. 4B illustrates an enlarged cross sectional view of an end margin region.

FIG. 4B illustrates an enlarged view of a cross section of the end margin region 15. Being different from the side margin region 16, in the end margin region 15, the internal electrode layers 12 in every other extend to an edge face of the end margin region 15. In the internal electrode layer 12 extending to the edge face of the end margin region 15, the reverse pattern layer 17 is not stacked. Each of the dielectric layers 11 of the capacity region 14 and each of the dielectric layers 11 of the end margin region 15 are continuously formed with each other. With the structure, a gap is suppressed between the capacity region 14 and the end margin region 15.

In the end margin region 15 and the side margin region 16 (hereinafter referred to as a margin region), contraction during a sintering may delay, compared to the capacity region 14. For example, the reason is such as a density difference between the margin region and the capacity region 14, diffusion of a co-material in the internal electrode layers 12 or the like. In particular, when a ceramic paste to be the reverse pattern layer 17 after the baking is formed by a printing process, a film density of the ceramic paste is low. Therefore, the contraction of the margin region tends to be slower than the contraction of the capacity region 14. A crack may occur in the multilayer ceramic capacitor 100 because of occurrence of stress caused by the contraction difference. The crack tends to occur in an interface between the margin region (in particular the side margin region 16) and the cover layer 13. The humidity resistance of the multilayer ceramic capacitor 100 may be degraded because of the occurrence of the stress.

And so, in the embodiment, a concentration of a sintering additive with respect to the main component ceramic in the reverse pattern layer 17 is higher than that of the dielectric layer 11. A concentration of an rare earth element with respect to the main component ceramic in the reverse pattern layer 17 is lower than that of the dielectric layer 11. When the concentration of the sintering additive is high, the sintering temperature becomes lower. The sintering additive includes Si and B that form a frame of glass as a network formation oxide. In the embodiment, a total concentration of Si (silicon) and B (boron) with respect to the main component ceramic of the reverse pattern layer 17 is higher than a total concentration of Si and B with respect to the main component ceramic of the dielectric layer 11. Thus, the sintering temperature of the reverse pattern layer 17 becomes lower. The total concentration of Si and B means that one of Si and B may not be necessarily included. However, it is preferable that B is included, because B lowers the softening point (melting point) during a liquid-phase sintering. It is preferable that each concentration of a sintering additive such as Al (aluminum), Mn (manganese), Mg (magnesium), Zn (zinc), Cu, Li (lithium), Na (sodium), K (potassium), Ca (calcium), Zr (zirconium), or the like forming a glass together with Si and B as the network formation oxide or an intermediate oxide in the reverse pattern layer 17 is higher than that of the dielectric layer 11.

A rare earth element has a function of raising the softening point (melting point) of a liquid phase sintering. Therefore, when a concentration of a rare earth element of the reverse pattern layer 17 is low, a sintering temperature of the reverse pattern layer 17 becomes lower. The rare earth element is such as Y (yttrium), Eu (europium), Gd (gadolinium), Tb (terbium), Dy (dysprosium), Ho (Holmium), Er (erbium), Yb (ytterbium) or the like.

With the structure, the rare earth element concentration with respect to the main ceramic of the margin region is lower than that of the capacity region 14, and the total concentration of Si and B of the margin region is higher than that of the capacity region 14. The sintering temperature of the reverse pattern layer 17 becomes sufficiently lower. Therefore, the difference of the contractions of the margin region and the capacity region 14 becomes sufficiently smaller. Thus, the occurrence of the stress caused by the contraction difference is suppressed. Therefore, the occurrence of the crack is suppressed, and the humidity resistance is improved.

In the embodiment, it is preferable that a concentration of V in the capacity region 14 is higher than that in the margin region, and a concentration of Mg in the margin region is higher than that in the capacity region 14. For example, it is preferable that V (vanadium) is added to the dielectric layers 11, V is not added to the reverse pattern layers 17, Mg is added to the reverse pattern layers 17, and Mg is not added to the dielectric layers 11. This is because: the life property is improved when V is solid-solved in the main component ceramic of the dielectric layers 11 and reduction resistivity is increased; sinterability is improved when Mg reduces a starting temperature of sintering of the reverse pattern layers 17; and the capacity, the life and the sinterability of the multilayer ceramic capacitor 100 is improved in good valance.

Figure 5:
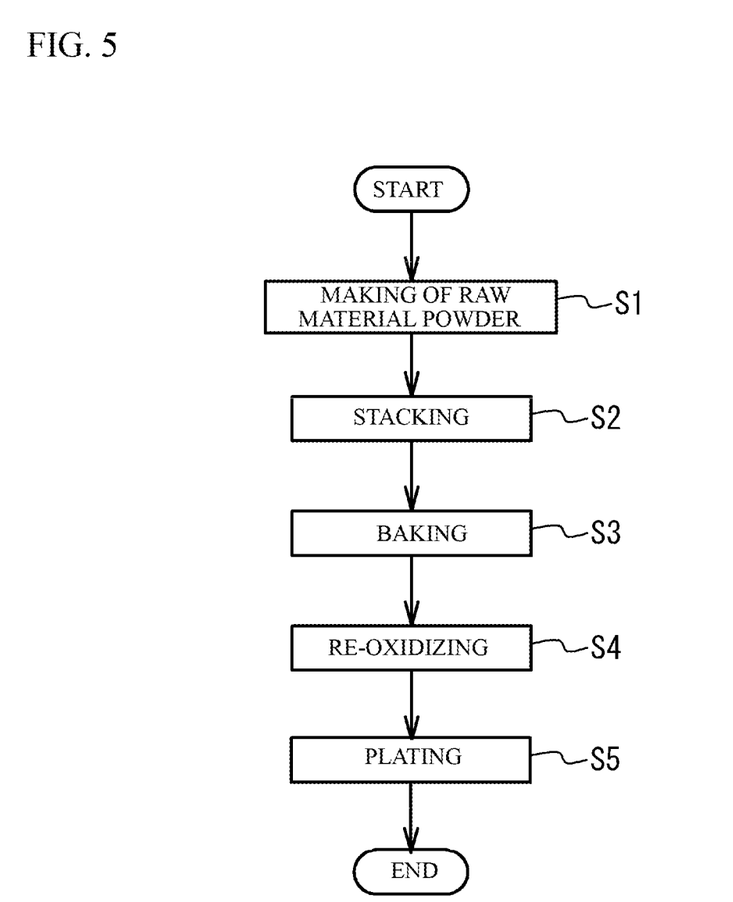
FIG. 5 illustrates a flow of a manufacturing method of a multilayer ceramic.

Next, a description will be given of a manufacturing method of the multilayer ceramic capacitor 100. FIG. 5 illustrates a manufacturing method of the multilayer ceramic capacitor 100.

(Making process of raw material powder) As illustrated in FIG. 5, a raw material powder for forming the dielectric layer 11 is prepared. Generally, an A site element and a B site element are included in the dielectric layer 11 in a sintered phase of grains of $BaTiO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

Additive compound may be added to the resulting ceramic material powder in accordance with purposes. The additive compound may be an oxide of Mn, V, Cr (chromium) or a rare earth element (Y (yttrium), Dy (dysprosium), Tm (thulium), Ho, Tb (terbium), Yb (ytterbium), Sm (samarium), Eu (europium), Gd (gadolinium) and Er (erbium)), or an oxide of Co (cobalt), Ni, Li (lithium), B, Na, K and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, a ceramic powder is obtained. For example, it is preferable that an average grain diameter of the resulting ceramic powders is 50 nm to 300 nm from a viewpoint of thickness reduction of the dielectric layer 11. For example, the grain diameter may be adjusted by crushing the resulting ceramic powder as needed. Alternatively, the grain diameter of the resulting ceramic power may be adjusted by combining the crushing and classifying.

A reverse pattern for forming the reverse pattern layer 17 is prepared. Additive compound may be added to ceramic powder of barium titanate obtained by the same process as the making process of the dielectric material in accordance with purposes. The additive compound may be an oxide of Mn, V, Cr or a rare earth element (Y, Dy, Tm, Ho, Tb, Yb, Sm, Eu, Gd and Er), or an oxide of Co, Ni, Li, B, Na, K and Si, or glass. In the embodiment, the total concentration of Si and B of the reverse pattern material is larger than that of the dielectric material. The rare earth element concentration of the reverse pattern material is smaller than that of the dielectric material.

In the embodiment, it is preferable that ceramic particles structuring the reverse pattern layer 17 are mixed with compound including additives and are calcined in a temperature range from 820 degrees C. to 1150 degrees C. Next, the resulting ceramic particles are wet-blended with additives, are dried and crushed. Thus, a ceramic powder is obtained. For example, it is preferable that an average grain diameter of the resulting ceramic powders is 50 nm to 300 nm. For example, the grain diameter of the resulting ceramic powder may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer such as dioctyl phthalate (DOP) are added to the resulting dielectric material and wet-blended. With use of the resulting slurry, a strip-shaped dielectric green sheet with a thickness of 1.2 μm or less is coated on a base material by, for example, a die coater method or a doctor blade method, and then dried.

Then, a first pattern of the internal electrode layer is provided on the surface of the dielectric green sheet by printing a metal conductive paste for forming an internal electrode with use of screen printing or gravure printing. The conductive paste includes an organic binder. A plurality of first patterns are alternatively exposed to the pair of external electrodes. As co-materials, ceramic particles are added to the metal conductive paste. A main component of the ceramic particles is not limited. However, it is preferable that the main component of the ceramic particles is the same as that of the dielectric layer 11. For example, $BaTiO_3$ of which an average particle diameter is 50 nm or less may be evenly dispersed.

Next, a binder such as ethyl cellulose and an organic solvent such as terpineol are added to the reverse pattern material. The reverse pattern material is kneaded by a roll mill. Thus, a reverse pattern paste is obtained. The reverse pattern paste is printed on a region on the dielectric green sheet around the first pattern. Thus, a reverse pattern (a second pattern) is provided. Therefore, a gap between the first pattern and the dielectric green sheet is reduced.

Then, the dielectric green sheet on which the first pattern and the second pattern are printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked green sheets and under the stacked sheets. The resulting compact is cut into a predetermined size (for example, 1.0 mm×0.5 mm). After that, metal conductive pastes to be the external electrodes 20a and 20b are coated on the both edge faces of the cut multilayer structure and are dried. Thus, a compact of the multilayer ceramic capacitor 100 is obtained.

(Baking process) The binder is removed from the resulting compact in $N_2$ atmosphere of a temperature range of 250 degrees C. to 500 degrees C. After that, the resulting compact is baked for ten minutes to 2 hours in a reductive atmosphere of which an oxygen partial pressure is $10^{-5}$ to $10^{-8}$ atm in a temperature range of 1100 degrees C. to 1300 degrees C. Thus, each compound of the dielectric green sheet is sintered and grown into grains. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C. (Plating process) After that, by a plating process, a metal such as Cu, Ni or Sn may be coated on the external electrodes 20a and 20b.

With the manufacturing method of the embodiment, the total concentration of Si and B with respect to the main component ceramic in the reverse pattern material is higher than the total concentration of Si and B with respect to the main component ceramic in the dielectric material. The concentration of the rare earth element with respect to the main component ceramic in the reverse pattern material is lower than the concentration of the rare earth element with respect to the main component ceramic in the dielectric material. In this case, the sintering temperature of the reverse pattern layers 17 becomes sufficiently lower, and the difference of the sintering temperatures between the margin region and the capacity region 14 becomes sufficiently lower. Thus, the occurrence of the stress caused by the difference is suppressed. Accordingly, the occurrence of the crack is suppressed, and the humidity resistance is improved.

In addition to Si and B, it is preferable that each concentration of a sintering auxiliary agent such as Al, Mn, Mg, Zn, Cu, Li, Na, K, Ca or Zr with respect to the main component ceramic in the reverse pattern material is higher than each concentration of the sintering auxiliary agent with respect to the main component ceramic in the dielectric material. In the reverse pattern material, it is preferable that the concentration of Si is 1.5 atm % or more and 3.0 atm % or less, the concentration of B is 0 atm % or more and 1.0 atm % or less, the concentration of Al is 0 atm % or more and 0.3 atm % or less, the concentration of Mn is 1.5 atm % or more and 3.0 atm % or less, and the concentration of Mg is 0.5 atm % or more and 1.5 atm % or less. It is preferable that the concentration of the rare earth element in the reverse pattern material is less than 0.1 atm %. It is more preferable that the concentration of the rare earth element in the reverse pattern material is 0 atm %.

[EXAMPLES]

The multilayer ceramic capacitors in accordance with the embodiment were made. And, property of the multilayer ceramic capacitors was measured.

(Making of dielectric material) In an example 1, $Ho_2O_3$, MgO, $MnCO_3$ and $SiO_2$ were weighed so that the Ho concentration was 0.38 atm %, the Mg concentration was 1 atm %, the Mn concentration was 0.15 atm % and the Si concentration was 0.56 atm % with respect to the barium titanate powder (average grain diameter was 150 nm), on a presumption that Ti was 100 atm %. In examples 2 and 3, $Ho_2O_3$, $V_2O_3$, $MnCO_3$ and $SiO_2$ were weighed so that the Ho concentration was 0.38 atm %, the V concentration was 0.093 atm %, the Mn concentration was 0.15 atm % and the Si concentration was 0.56 atm % with respect to the barium titanate powder (average grain diameter was 150 nm), on a presumption that Ti was 100 atm %. After that, the resulting barium titanate powder was sufficiently wet-blended and crushed. Thus, the dielectric material was obtained.

(Making of reverse pattern material) In the examples 1 and 3, MgO, $MnCO_3$, $SiO_2$, $B_2O_3$ and $Al_2O_3$ were weighed so that the Mg concentration was 1 atm %, the Mn concentration was 2.25 atm %, the Si concentration was 2.28 atm %, the B concentration was 0.76 atm % and the Al concentration was 0.16 atm % with respect to the barium titanate powder (average grain diameter was 150 nm), on a presumption that Ti was 100 atm %. In the example 2, $V_2O_3$, $MnCO_3$, $SiO_2$, $B_2O_3$ and $Al_2O_3$ were weighed so that the V concentration was 0.093 atm %, the Mn concentration was 2.25 atm %, the Si concentration was 2.28 atm %, the B concentration was 0.76 atm % and the Al concentration was 0.16 atm % with respect to the barium titanate powder (average grain diameter was 150 nm), on a presumption that Ti was 100 atm %. In comparative examples 1 and 5, $Ho_2O_3$, MgO, $MnCO_3$, $SiO_2$ and $B_2O_3$ were weighed so that the Ho concentration was 0.38 atm %, the Mg concentration was 1 atm %, the Mn concentration was 0.38 atm %, the Si concentration was 1 atm % and the B concentration was 0.16 atm % with respect to the barium titanate powder (average grain diameter was 150 nm), on a presumption that Ti was 100 atm %. In comparative examples 2 and 6, $Ho_2O_3$, MgO, $MnCO_3$, $SiO_2$, $B_2O_3$ and $Al_2O_3$ were weighed so that the Ho concentration was 0.38 atm %, the Mg concentration was 1 atm %, the Mn concentration was 2.25 atm %, the Si concentration was 2.28 atm %, the B concentration was 0.76 atm % and the Al concentration was 0.16 atm % with respect to the barium titanate powder (average grain diameter was 150 nm), on a presumption that Ti was 100 atm %. After that, the resulting barium titanate powder was sufficiently wet-blended and crushed. Thus, the reverse pattern material was obtained. In the comparative example 3, $Ho_2O_3$, $V_2O_3$, $MnCO_3$, $SiO_2$ and $B_2O_3$ were weighed so that the Ho concentration was 0.38 atm %, the V concentration was 0.093 atm %, the Mn concentration was 0.38 atm %, the Si concentration was 1 atm %, the B concentration was 0.16 atm % with respect to the barium titanate powder (average grain diameter was 150 nm), on a presumption that Ti was 100 atm %. In the comparative example 4, $Ho_2O_3$, $V_2O_3$, $MnCO_3$, $SiO_2$, $B_2O_3$ and $Al_2O_3$ were weighed so that the Ho concentration was 0.38 atm %, the V concentration was 0.093 atm %, the Mn concentration was 2.25 atm %, the Si concentration was 2.28 atm %, the B concentration was 0.76 atm % and the Al concentration was 0.16 atm % with respect to the barium titanate powder (average grain diameter was 150 nm), on a presumption that Ti was 100 atm %. After that, the resulting barium titanate was sufficiently wet-blended and crushed. After that, the resulting barium titanate was sufficiently wet-blended and crushed. Thus, the reverse pattern material was obtained.

(Making of reverse pattern paste) An organic binder and a solvent were added to the reverse pattern material. The resulting reverse pattern material was dispersed with use of bead mill. Thus, the reverse pattern paste was obtained.

(Making of multilayer ceramic capacitor) An organic binder and a solvent were added to the dielectric material and dispersed by a bead mill. And green sheet having a thickness of approximately 1.2 μm were made. The paste for the internal electrode was screen-printed on the green sheets. The reverse pattern paste was screen-printed on the region of the green sheet around the paste for the internal electrode. Thus, the gap was reduced. 600 numbers of the green sheets on which the conductive paste for forming an internal electrode and the reverse pattern were printed were stacked. Cover sheets having a thickness of 60 μm were stacked on a lower face and an upper face of the stacked sheets. After that, a multilayer structure was obtained by a thermo compression bonding of 150 MPa. And the resulting multilayer structure was cut into a predetermined shape. The length was 1.6 mm, the width was 0.8 mm and the height was 0.8 mm. Ni external electrodes were formed on the resulting multilayer structure by a dip method. After removing the binder in a N2 atmosphere, the resulting multilayer structure was baked at 1230 degrees C. in a reductive atmosphere ($O_2$ partial pressure: $10^{-5}$ to $10^{-8}$ atm). And sintered multilayer structure was formed. The sintered multilayer structure was subjected to an annealing process at 1140 degrees C. and was re-oxidized in a $N_2$ atmosphere at 900 degrees C. After that, metals of Cu, Ni and Sn were coated on a surface of the external electrode terminals by plating. And, a multilayer ceramic capacitor was formed. 400 samples were made with respect to each of the example and the comparative examples 1 and 2.

Figure 6:
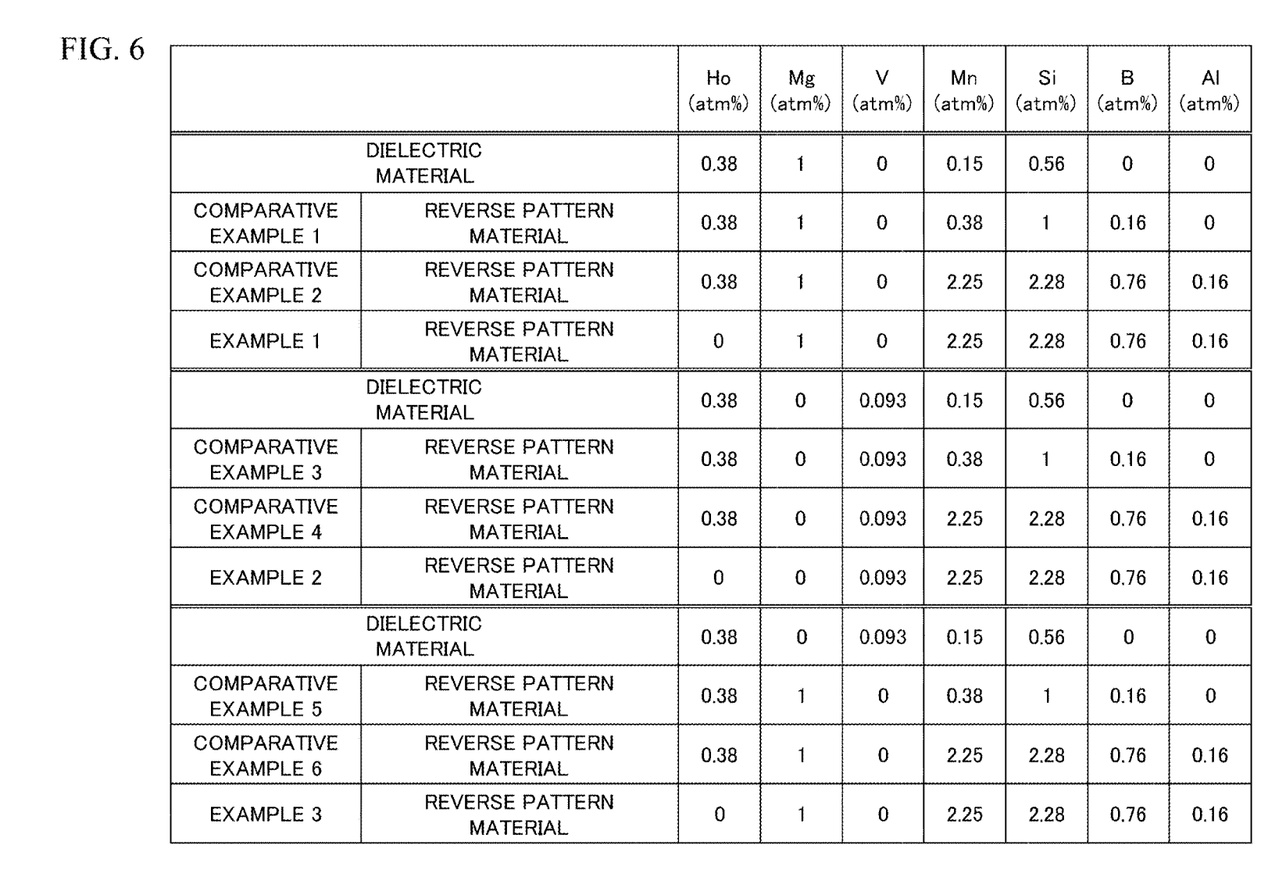
FIG. 6 illustrates results of examples and comparative examples.
Figure 7:
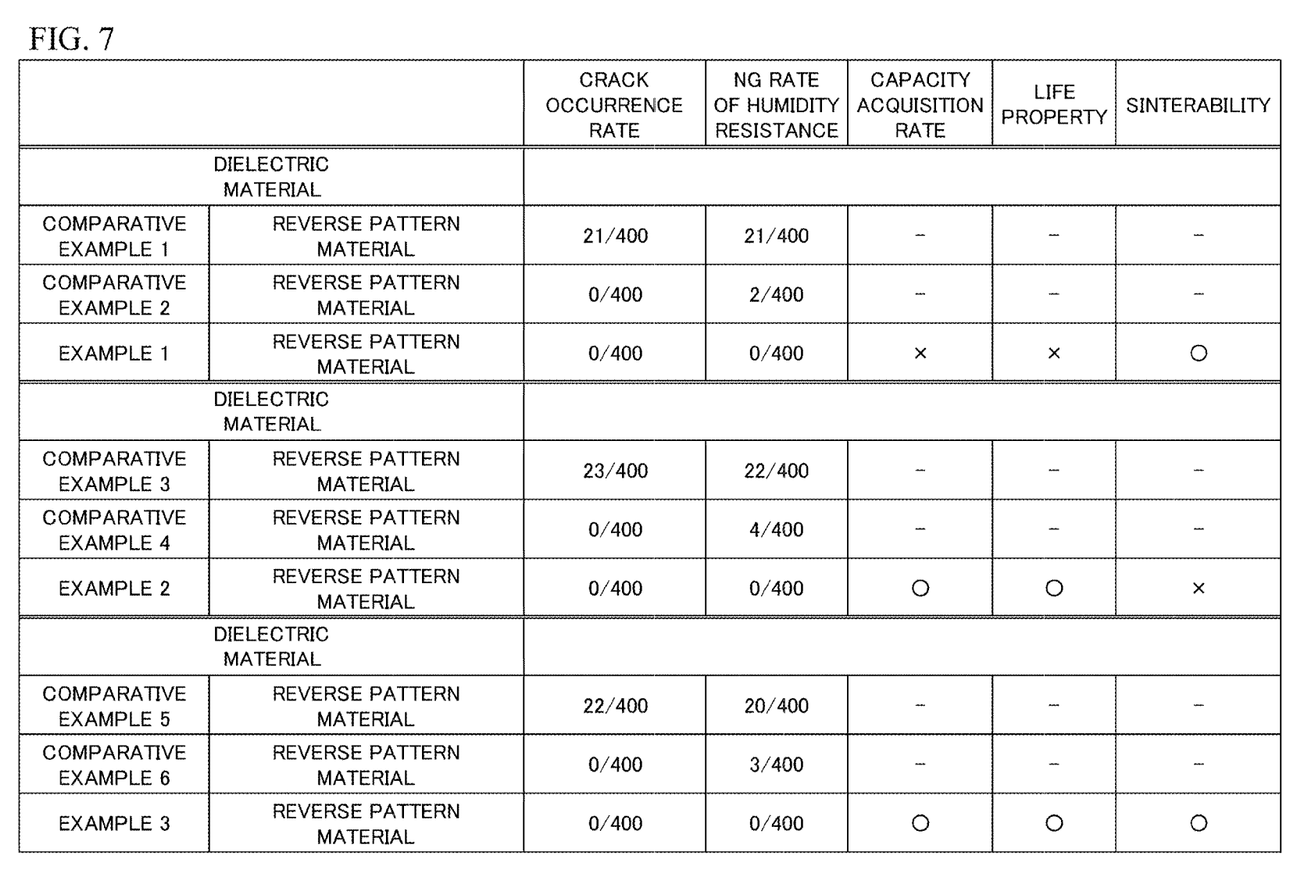
FIG. 7 illustrates results of examples and comparative examples.

(Analysis) A crack occurrence rate, an NG rate of humidity resistance load test, a capacity acquisition rate, life property and sinterability of the examples 1 to 3 and the comparative examples 1 to 6 were measured. The crack occurrence rate was measured by a visual inspection with respect to 400 samples with use of a stereoscopic microscope. The humidity resistance load test was performed under a condition of ambient temperature: 40 degrees C., a relative humidity: 95% RH, an applied voltage: DC 6.3 V, a held time: 100 hours, with respect to 400 samples. And each insulation resistance was measured with respect to each sample. When an insulation resistance of a sample was less than 1 MΩ, it is determined that the sample was an NG sample. The capacity acquisition rate was measured by measuring a capacity with an LCR meter. The measured values were compared with design values that were calculated from the dielectric constant of the dielectric material, the crossing area of the internal electrode layers 12, the thickness of the dielectric layers 11 and the number of stacking. The dielectric constant was calculated by making a disk-shaped sintered structure of ϕ=10 mm×T=1 mm from only the dielectric material and measuring the dielectric constant. When the capacity acquisition rate (the measured value/the design value×100) was 90% to 105%, the capacity acquisition rate was determined as good. In a case where the design value of the capacity was 47 μF when the measured value was 47×90% =42.3μF or more under a condition that OSC was 0.5 V and a frequency was 120 Hz, the capacity acquisition rate was determined as good. When a 50% breakdown value of 50 chips was 100 minutes or more in an accelerated life test of 140 degrees C.−17 V/μm, the life property was determined as good. When the 50% breakdown value was less than 100 minutes, the life property was determined as bad. With respect to the sinterability, a pore ratio was measured by a binarization quantification method of a residual pore by a SEM observation of a polished face. When the pore ratio of the side margin region 16 was less than 6%, the sinterability was determined as good. When the pore ratio was 6% or more, the sinterability was determined as bad. FIG. 6 and FIG. 7 illustrates the results.

As illustrated in FIG. 6 and FIG. 7, the crack occurrence rate of the comparative example 2 was lower than that of the comparative example 1. The crack occurrence rate of the comparative example 4 was lower than that of the comparative example 3. The crack occurrence rate of the comparative example 6 was lower than that of the comparative example 5. This is because the total concentration of Si and B with respect to the main component ceramic in the reverse pattern material of the comparative example 2 was higher than that of the comparative example 1, the total concentration of Si and B with respect to the main component ceramic in the reverse pattern material of the comparative example 4 was higher than that of the comparative example 3, the total concentration of Si and B with respect to the main component ceramic in the reverse pattern material of the comparative example 6 was higher than that of the comparative example 5, and the sintering temperature of the reverse pattern material of the comparative examples 2, 4 and 6 became lower. Moreover, the concentrations of Mn and Al of the comparative example 2 were higher than those of the comparative example 1, the concentrations of Mn and Al of the comparative example 4 were higher than those of the comparative example 3, and the concentrations of Mn and Al of the comparative example 6 were higher than those of the comparative example 5. However, in the comparative examples 2, 4 and 6, an NG rate of humidity resistance could not be suppressed. This is because the sintering temperature of the reverse pattern material was not sufficiently reduced. On the other hand, in the examples 1 to 3, the crack occurrence rate and the NG rate of humidity resistance were lower than those of the comparative examples 1 to 6. This is because: the total concentration of Si and B with respect to the main component ceramic of the reverse pattern material was higher than the total concentration of Si and B with respect to the main component ceramic of the dielectric material; the concentration of the rare earth element with respect to the main component ceramic of the reverse pattern material was lower than the concentration of the rare earth element with respect to the main component ceramic of the dielectric material; and the sintering temperature difference became sufficiently lower between the dielectric material and the reverse pattern material.

In the example 1, preferable sinterability was achieved. This is because Mg reduced the starting temperature of the sintering of the reverse pattern layer 17. In the example 2, a preferable capacity acquisition rate and preferable life property were achieved. This is because V was solid-solved in the barium titanate acting as the main component ceramic of the dielectric layers 11, and the reduction resistivity was increased. Next, in the example 3, a preferable capacity acquisition rate, preferable life property and preferable sinterability were achieved, compared to the examples 1 and 2. This is because V was added to the dielectric material, V was not added to the reverse pattern material, Mg was added to the reverse pattern material, Mg was not added to the dielectric material, and the capacity, the life property and the sinterability of the multilayer ceramic capacitor 100 were improved in good balance.

Figure 8:
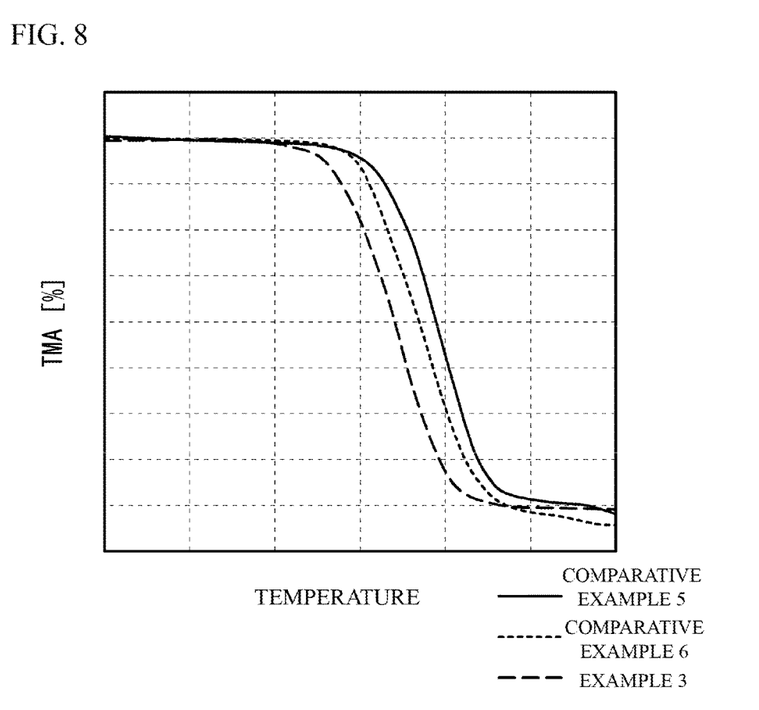
FIG. 8 illustrates a thermomechanical analysis (TMA) during a sintering of a reverse pattern material of examples and the comparative examples.

FIG. 8 illustrates a thermomechanical analysis (TMA) during the sintering of the reverse pattern material of the example 3 and the comparative examples 5 and 6. As illustrated in FIG. 8, the sintering temperature of the reverse pattern material of the example 3 became apparently lower than the reverse pattern material of the comparative examples 5 and 6.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer structure in which each of a plurality of ceramic dielectric layers and each of a plurality of internal electrode layers are alternately stacked, a main component of the plurality of dielectric layers being ceramic, the multilayer structure having a rectangular parallelepiped shape, the plurality of internal electrode layers being alternately exposed to a first edge face and a second edge face of the multilayer structure, the first edge face facing with the second edge face,
wherein:
a concentration of a rare earth element of at least one of an end margin region and a side margin region with respect to a main component ceramic is lower than a concentration of the rare earth element of a capacity region with respect to a main component ceramic;
a total concentration of Si and B of the at least one of the end margin region and the side margin region with respect to the main component ceramic is higher than a total concentration of Si and B of the capacity region with respect to the main component ceramic;
the capacity region is a region in which a set of internal electrode layers exposed to the first edge face of the multilayer structure face with another set of internal electrode layers exposed to the second edge face of the multilayer structure is a capacity region;
the end margin region is a region in which internal electrode layers coupled to the first edge face of the multilayer structure face with each other without sandwiching internal electrode layers coupled to the second edge face of the multilayer structure and a region in which internal electrode layers coupled to the second edge face of the multilayer structure face with each other without sandwiching internal electrode layers coupled to the first edge face of the multilayer structure; and
the side margin region is a region that covers edge portions to which the plurality of internal electrode layers extend toward two side faces other than the first edge face and the second edge face.

2. The multilayer ceramic capacitor as claimed in claim 1, wherein each of concentrations of Mn and Al of the at least one of the end margin region and the side margin region is higher than each of concentrations of Mn and Al of the capacity region.

3. The multilayer ceramic capacitor as claimed in claim 1, wherein:
a concentration of V of the capacity region is higher than a concentration of V of the margin region; and
a concentration of Mg of the margin region is higher than a concentration of Mg of the capacity region.

4. The multilayer ceramic capacitor as claimed in claim 1, further comprising a cover layer on at least one of an upper face and a lower face of the multilayer structure, a main component of the cover layer being the same as a main component of the plurality of dielectric layers.

5. The multilayer ceramic capacitor as claimed in claim 1, wherein a main component ceramic of the capacity region, the end margin region and the side margin region is barium titanate.

6. The multilayer ceramic capacitor as claimed in claim 1, wherein
the total concentration of Si and B of both of the end margin region and the side margin region with respect to the main component ceramic is higher than the total concentration of Si and B of the capacity region with respect to the main component ceramic.

7. A manufacturing method of a multilayer ceramic capacitor comprising:
a first step of providing a first pattern of a metal conductive paste on a green sheet including main component ceramic grains;
a second step of providing a second pattern including main component ceramic grains, on a part of the green sheet around the metal conductive paste; and
a third step of baking a ceramic multilayer structure that is obtained by stacking a plurality of layer units obtained in the second step,
wherein:
a total concentration of Si and B of the second pattern with respect to the main component ceramic of the second pattern is higher than a total concentration of Si and B of the green sheet with respect to the main component ceramic of the green sheet; and
a concentration of a rare earth element of the second pattern with respect to the main component ceramic of the second pattern is lower than a concentration of the rare earth element of the green sheet with respect to the main component ceramic of the green sheet.

8. The manufacturing method of a multilayer ceramic capacitor as claimed in claim 7, wherein:
the green sheet includes V and does not include Mg; and
the second pattern includes Mg and does not include V.

* * * * *